United States Patent [19]
Yoon et al.

[11] Patent Number: 5,670,056
[45] Date of Patent: Sep. 23, 1997

[54] CHEMICAL-MECHANICAL DEWATERING PROCESS

[75] Inventors: Roe-Hoan Yoon; Cesar Indiongco Basilio, both of Blacksburg, Va.

[73] Assignee: Virginia Tech Intellectual Properties, Inc., Blacksburg, Va.

[21] Appl. No.: 540,178

[22] Filed: Oct. 6, 1995

Related U.S. Application Data

[63] Continuation-in-part of Ser. No. 423,562, Apr. 17, 1995, abandoned.

[51] Int. Cl.[6] ........................................... C02F 1/54
[52] U.S. Cl. .................... 210/728; 44/626; 209/5; 210/729; 210/732; 210/770; 210/771; 210/778
[58] Field of Search .................... 209/5; 44/564, 44/568, 626; 210/725, 727, 728, 729, 732, 770, 772, 777, 778, 771; 252/60, 61

[56] References Cited

U.S. PATENT DOCUMENTS

| | | | |
|---|---|---|---|
| 4,290,896 | 9/1981 | Gordon et al. | 210/710 |
| 4,290,897 | 9/1981 | Swihart | 210/778 |
| 4,943,378 | 7/1990 | Flesher et al. | 210/734 |
| 4,981,582 | 1/1991 | Yoon | 209/164 |
| 5,011,612 | 4/1991 | Keeney | 210/727 |
| 5,167,798 | 12/1992 | Yoon | 209/170 |
| 5,215,669 | 6/1993 | Koester et al. | 210/778 |
| 5,346,630 | 9/1994 | Kenney | 210/728 |
| 5,372,727 | 12/1994 | Koester et al. | 210/778 |
| 5,397,001 | 3/1995 | Yoon | 209/170 |

Primary Examiner—Peter A. Hruskoci
Attorney, Agent, or Firm—Whitham, Curtis, Whitham & McGinn

[57] ABSTRACT

Small, wet particulate material is effectively dried by adding a hydrophobizing agent to coat the surfaces of the particulates, and then mechanically removing water droplets from the surfaces of the particulates. Once on the surface of the particulates, the hydrophobizing reagent makes the particulates relatively more hydrophobic and increases the water contact angle on the particulates. The moisture content of the particulate material can easily be reduced to levels below 20%, below 10%, and even below 5%. The process can be used to dewater a wide variety of constituents including coal particles, clays, sulfides, phosphorous compounds, minerals, metals, waste sludge, etc. Particularly preferred hydrophobizing reagents include mono unsaturated fatty esters and polysiloxane polymers.

25 Claims, 1 Drawing Sheet

CHEMICAL-MECHANICAL DEWATERING PROCESS

CROSS-REFERENCE TO RELATED APPLICATIONS

This patent application is a continuation-in-part (CIP) application of the patent application filed Apr. 17, 1995, having U.S. Ser. No. 08/423,562, now abandoned and the complete contents of the application is herein incorporated by reference.

DESCRIPTION

BACKGROUND OF THE INVENTION

1. Field of the Invention

The invention is generally related to removing water from small particles using chemical and mechanical mechanisms instead of water removal by heating. More particularly, the invention is related to a process which includes the step of altering the surface chemistry of a particle to increase the water contact angle on the surface of the particle, and then mechanically removing the water droplets from the particle by gas pressure or the like.

2. Description of the Prior Art

Minerals such as coal, clays, phosphates, sulfides, and the like, and metals such as copper, tungsten, silver, and gold, are often mixed with water to form an aqueous slurry for various processing operations. For example, U.S. Pat. Nos. 4,981,582, 5,167,798, and 5,397,001 to Yoon et al. describe microbubble floatation technology used to separate fine particles of minerals or coal from non-valuable materials. Waste materials are also often combined with water in various sewage handling operations.

While water provides a convenient medium for performing a wide variety of operations, such as cleaning, material transport, reaction chemistry, etc., problems arise when the ultimate product desired is dried particulate material. When water clings to the surfaces of valuable materials such as coal, clays, minerals, metals, etc., it adds non-useful weight to the material. This weight increases the cost of transporting the material truck or train. In addition, the water may effect the performance of the material. For example, coal burns less efficiently.

The problem of surface water clinging to particulates is most severe in smaller particles, such as particles of less than 0.1 inches in diameter. This is due to the smaller particles having much higher surface to volume ratios.

A wide variety of technologies have been developed to dry particulate matter.

One method simply involves removing water by heating the material. Thermal heating requires a significant amount of energy input. The energy must be sufficient to overcome the attraction between the water molecules with each other and the particulate material, thereby vaporizing the water and leaving a dry material. As a practical matter, the cost of the energy required to thermally dry the particulate material may be more expensive than the value of the particulate material to be salvaged. In addition, the thermal drying technique would be ineffective for particulate materials which liquefy or undergo a phase change below the temperature required for water removal, and the thermal drying technique poses environmental problems due to the requirement of large amounts of air input and steam effluent.

Another method involves mechanically removing water by vacuum filtration, pressure filtration, hyperbaric filtration, centrifugation, etc. While these techniques do not expose the particulate matter to heat, they do require a tremendous amount of energy input. Under these methods, energy is required to overcome the force of attraction of the water molecule to the particulate matter. Current mechanical drying techniques have not proven satisfactory in achieving a suitable dryness in coal and minerals processing operations. In addition, these techniques are time consuming, and often involve tedious steps such as the separation of caked particulates.

Currently, small particles of phosphates, coal, and other minerals and metals, are often discarded due to difficulties in cleaning and drying the particles. This practice is tremendously wasteful and has an adverse impact on the environment. What is needed is an environmentally safe, effective, and inexpensive method for dewatering particles, that will allow the recovery and use of material which would otherwise be discarded.

SUMMARY OF THE INVENTION

It is an object of this invention to provide a low cost, safe and effective technique for dewatering particles which employs chemical and mechanical treatment processes.

It is another object of this invention to provide a dewatering process which employs a water soluble or dispersable, disposable, hydrophobizing agent.

It is yet another object of this invention to provide a dewatering process for small particulate materials which utilizes as a hydrophobizing agent a mono-unsaturated fatty acid esters having the general structural formula $R_1$—C(O)—O—$R_2$ where $R_1$ is a mono-unsaturated aliphatic moiety and is preferably an oleate and $R_2$ is an aliphatic moiety (e.g., $C_{1-6}$ carbons, including moieties such as methyl, ethyl, propyl, butyl, etc.), or an alcohol (e.g., glycerol ($C_3H_8O_3$), ethylene glycol ($CH_2CH_2OH$), polyethylene glycol ($CH_2CH_2OH)_n$, etc.).

It is yet another object of this invention to use polysiloxane polymers, and particularly polymethylhydrosiloxane, as hydrophobizing agents in a dewatering process for small particulate materials.

According to the invention, the surfaces of particles are altered to make them more hydrophobic. The water contact angle on the particle surface increases as the hydrophobicity of the particle increases, and this change in the contact angle reduces the tendency of water droplets to remain attached to the surfaces of the particles. The surface chemistry of the particles can be changed while the particles are in a mixture or slurry together with water simply by adding a hydrophobizing agent, such as a hydrophobic polymer or surfactant, to the mixture or slurry. The hydrophobizing agent will have a stronger attraction for the particle surface than water and will be able to coat the particle surfaces. After the particles have been rendered more hydrophobic, they can be mechanically dewatered by application of direct air pressure, vacuum filtration, centrifugation or the like.

Particularly good dewatering results can be obtained with mono-unsaturated fatty acid esters having the general structural formula $R_1$—C(O)—O—$R_2$ where $R_1$ is a mono-unsaturated aliphatic moiety and is preferably an oleate and $R_2$ is an aliphatic moiety (e.g., $C_{1-6}$ carbons, including moieties such as methyl, ethyl, propyl, butyl, etc.), or an alcohol (e.g., glycerol ($C_3H_8O_3$), ethylene glycol ($CH_2CH_2OH$), polyethylene glycol ($CH_2CH_2OH)_n$, etc.). For example, experiments with coal particulate slurries have demonstrated that small quantities (e.g., less than 5% by weight of the slurry) of oleate compounds such as methyl oleate, DL-α-monoolein, and ethylene glycol monooleate, can be used to dry the particulate to a moisture content of less than 10% by weight or lower (e.g., less than 5% by weight, less than 2% by weight, etc.). These compounds are so effective that even parts per million (ppm) quantities (less than 1% by weight) can be used to cause a significant decrease in moisture content of coal particulates. Experiments also demonstrate that these compounds are effective for reducing the moisture content of other moist particulates including lead and zinc sulfide concentrates.

In addition, particularly good dewatering results can be obtained using low molecular weight (e.g., less than 100,000 MW) hydrophobic polymers, and particularly polysiloxane polymers, as hydrophobizing reagents. For example, small quantities of polymethylhydrosiloxane (MW<100,000) are effective for reducing the moisture content of particulate slurries, and coal slurries specifically.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
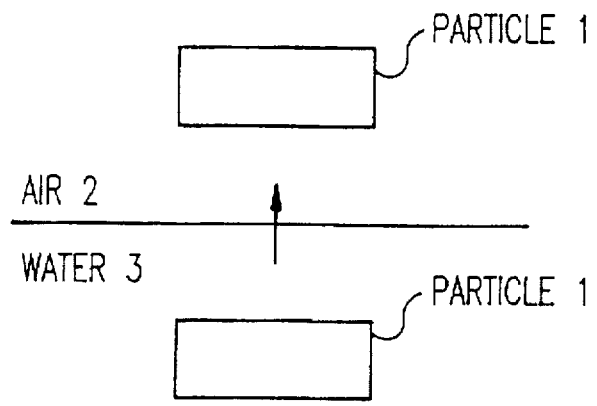
FIG. 1 is a schematic diagram showing the changes in surface free energies with the transfer of a particle to from water to air phase.
Figure 2:
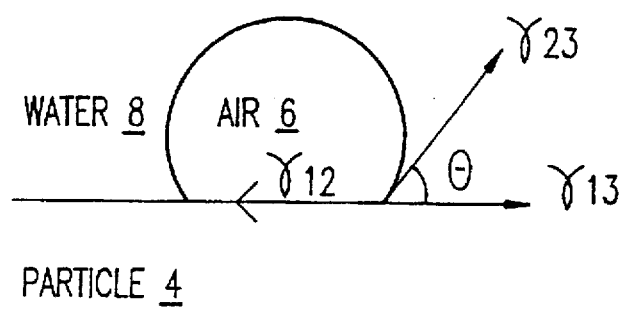
FIG. 2 is a schematic diagram showing the equilibrium between interfacial energies at a three phase contact, where $Y_{12}$, $Y_{13}$, and $Y_{23}$ are the interfacial tensions between the particle and air, the particle and water, and water and air, respectively.
Figure 3:
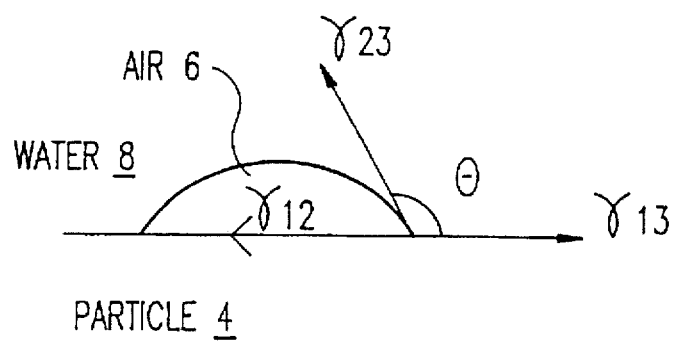
FIG. 3 is a schematic diagram similar to that shown in FIG. 2, but where a hydrophobizing agent has been added to the surface of the particle.

FIGS. 1–3 illustrate one of the central principles of this invention. Specifically, with reference to FIG. 1, a particle 1 is shown to emerge from water phase 3 to air or vapor phase 2. The free energy per unit surface area of the particle is given by Equation 1.

$$\frac{\delta G_{dis}}{\delta A} = \gamma_{12} - \gamma_{13} \qquad \text{Eq. 1}$$

In Equation 1, $Y_{12}$ is the interfacial tension between the particle and air and $Y_{13}$ is the same between the particle and water.

FIGS. 2 and 3 show alternative equilibrium diagrams for the three interfacial tensions at the three-phase contact of the particle 4, air 6, and water 8. The Young's equation, derived from both FIGS. 2 and 3, can be used to express $Y_{12}$ as a function of water contact angle, θ, and the interfacial tension between water and air, $Y_{23}$. Equation 2 sets forth the Young's equation.

$$Y_{12} = Y_{23}\cos\theta + Y_{13} \qquad \text{Eq. 2}$$

By substituting Equation 1 into Equation 2, the relationship set forth in Equation 3 is obtained.

$$\frac{\delta G_{dis}}{\delta A} = \gamma_{23}\cos\theta \qquad \text{Eq. 3}$$

In order for dewatering from a particle surface to be spontaneous, $dG_{dis}/dA$ should be less than zero. As is set forth in Equation 4, spontaneous dewatering of a particle requires that the contact angle between the water 8 and particle 4 be greater than 90°

$$Y_{23}\cos\theta < 0 \qquad \text{Eq. 4}$$

This condition is expressly shown in FIG. 3.

Unfortunately, most particulate materials are not hydrophobic enough to allow for spontaneous dewatering. Even the most hydrophobic bituminous coals have water contact angles of less than 65°, as measured by the captive bubble technique (See, Aplan, *Advances in Coal and Mineral Processing Using Flotation*, SME, Littleton, Colo., 95(1989)). FIG. 2 illustrates the situation where the contact angle is less than 90°.

The above explanation demonstrates that mechanical dewatering of most particulate materials, including materials which have been generally regarded as hydrophobic, without prior modification of the interfacial tensions $Y_{12}$, $Y_{13}$, and $Y_{23}$, is not a thermodynamically favorable process.

This invention contemplates altering the hydrophobicity of particle surfaces such that the thermodynamics of mechanical dewatering become more favorable. This is accomplished by adding a water soluble, disposable, hydrophobizing reagent to a mixture or slurry of particles and water. The hydrophobizing reagent will be selected to change the surface chemistry of the particle such that the contact angle between the water and particle is increased and the water is more easily removed from the particle surface. Preferably, the contact angle is increased to 80°–90° or more. As discussed above, when the contact angle is greater than 90°, dewatering will be spontaneous.

The process will be useful in dewatering a wide variety of particulate material including coals, clays, sulfides, phosphates, metals, minerals, waste materials, or other particles. The process can be used for dewatering small particles which are typically less than 0.5–3 inches in diameter. However, it has particular application in dewatering very fine particles which are on the order of nanometers to millimiters (1 nm–10 mm) in size. As discussed above, removal of water from very fine particles is a more difficult task because these particles have a much higher surface to volume ratio.

The hydrophobizing reagent must be water soluble or water dispersable (e.g., an emulsion) in order to enable it to be applied to the surfaces of the particles being dewatered. Solid and nonsoluble reagents will not be distributable onto the surfaces of the particles simply by addition to a mixture of water and particles. What is needed is a disposable reagent that can be added directly to the water/particle mixture or slurry, and which will dissolve and distribute itself over the surfaces of the particles in the mixture or slurry. Agitation of the water/particle mixture or slurry after addition of the hydrophobizing reagent can assist in distributing the hydrophobizing reagent.

The mixture of particles and water into which the hydrophobizing reagent will be deposited will generally have a moisture content of 5%–99% by weight. The invention is practicable with mixtures having high solids content, such as, for example, mixtures with a moisture content of 10–60%. If desired, all or a substantial portion of the free water can be removed from the mixture by filtration, straining or other means prior to adding the hydrophobizing reagent. However, it is expected that having some free water present (5–99%) prior to addition of the hydrophobizing reagent is beneficial since the free water can serve as a vehicle for distributing the hydrophobizing reagent on the particle surfaces.

One example of suitable hydrophobizing reagents within the practice of this invention are low molecular weight hydrophobic polymers or polymer blends. Preferably, the hydrophobic polymer will have a molecular weight ranging from 5,000 to 20,000,000 Daltons. Most preferably, the hydrophobic polymer will have a molecular weight ranging from 500,000 to 5,000,000 Daltons. Higher molecular weight polymers tend to have much larger viscosity, and to not be water soluble. Suitable hydrophobic polymers include polymethacrylates, polyacrylates, polysiloxanes, hydrophobic polyacrylamides, polypropylene glycols, and hydrophobic emulsion polymers. Particularly good fine coal dewatering results can be achieved using low molecular weight (MW<100,000) polymethylhydrosiloxane which has the chemical formula: $(CH_3)_3SiO[(CH_3)HSiO]_nSi(CH_3)_3$.

The hydrophile-lipophile (HLB) is an empirical method first developed by Griffin (see, Griffin, *J. Soc. Cosmet. Chem.*, 1949, vol. 311) for quantifying the surface activity of a surfactant based on its molecular composition. The HLB value ranges from 0 to 20. At the high end of the scale are hydrophilic surfactants which possess high water solubility and generally act as solubilizing agents, detergents and stabilizers for oil-in-water emulsions; at the low end are surfactants with low solubility which act as solubilizers of water in oils and are good water-in-oil emulsion stabilizers.

Another example of suitable hydrophobizing reagents may be surfactants such as fatty esters, ethoxylated fatty acids, ethoxylated fatty esters and oils, short chain alkyl- (e.g., $C_6$ or less) and alkyl-aryl (e.g., $C_{12}$ or less) surfactants, non-ionic surfactants of low HLB values (e.g., 10 or less), and mixtures thereof. In addition, combinations of surfactants and hydrophobic polymers described above could be employed. Particularly good dewatering results have been obtained using mono-unsaturated fatty esters, including oleates such as methyl oleate $(CH_3(CH_2)_7CH:CH(CH_2)_7COOCH_3)$, DL-α-monoolein $(CH_3(CH_2)_7CH:CH(CH_2)_7COOC_3H_7O_2)$, and ethylene glycol monooleate $(CH_3(CH_2)_7CH:CH(CH_2)_7COOCH_2CH_2OH)$. In view of the results presented below in the Examples sections, it is expected that moist particulate dewatering can be advantageously performed using additive compounds of the general structural formula $R_1-C(O)-O-R_2$ where $R_1$ is a mono-unsaturated aliphatic moiety and is preferably an oleate and $R_2$ is an aliphatic moiety (e.g., $C_{1-6}$ carbons, including moieties such as methyl, ethyl, propyl, butyl, etc.), or an alcohol(e.g., glycerol $(C_3H_8O_3)$, ethylene glycol $(CH_2CH_2OH)$, polyethylene glycol $(CH_2CH_2OH)_n$, etc.).

The surfactants should be chosen to enhance dewatering by altering the hydrophobicity of the particles; rather than enhancing the wettability of the particles, as is the case with many surfactants. Long chain surfactants have a tendency to absorb on hydrophobic surfaces, such as coal, with inverse orientation. Under this condition, the polar groups of surfactants point toward the aqueous phase, making the surface more hydrophillic. This situation can be avoided if shorter chain surfactants are used. For example, optimum results may be achieved when the chain length is 2 to 20. When the chain length is properly controlled, the attractive hydrophobic force between the hydrocarbon tail and the particle surface can be made smaller than the attractive force between the polar group of surfactants and the polar (or hydrophillic) sites on the particle surface. In this case, the surfactant can adsorb selectively on the hydrophillic sites of coal with the normal mode of orientation, i.e., with polar heads in contact with the surface and the hydrocarbon tail pointed toward the aqueous phase, thereby increasing the overall hydrophobicity of the particle.

The concentration of the hydrophobizing reagent added to the water/particle mixture or slurry need not be very high. Optimum results can be obtained when 1–40 lbs of hydrophobizing reagent per ton of particles have utilized. For example, surfactants added to slurry of coal having a moisture content of 98% at a ratio of 2–8 lbs/ton of coal particles were useful in allowing dewatering to a moisture content of 1–10%. One should not add a significant amount of the hydrophobizing reagent to the water/particle mixture or slurry, since, the objective is to dewater the particles, not to add the weight of the surfactant to the particles.

Once the hydrophobizing agent has been combined with the water/particle mixture, and allowed a sufficient time for the hydrophobizing reagent to become distributed throughout the mixture onto the surfaces of the particles, the water can be removed by mechanical means. Suitable mechanical techniques include centrifugation, vacuum filtration, pressure filtration and the like. The prior chemical treatment with the hydrophobizing reagent allows the water to be removed more quickly and inexpensively with the mechanical techniques. In addition, results have demonstrated that the water removal is considerably more effective after prior alteration of the particle hydrophobicity. For example, particle dryness down to a moisture content of 20% was easily achieved, and moisture contents as low as 12% were obtained. To be commercially applicable, it is desirable to obtain dryness levels below 20%, and most preferably below 5–10%.

A simple procedure to remove the water from the mixture is to place the particles on a filter media or sieve, allow the free water to be strained from the mixture, and to direct a gas such as air over the surfaces of the particles. Due to the contact angle being altered prior to the air pressure treatment, water will be removed from the surfaces extremely easily or even spontaneously. When air is used as the mechanical mechanism for removing water, good results have been obtained when the air is applied at pressures ranging from 10 psi to 140 psi. The air or gas temperature can be at ambient (e.g., 20°–35° C.). Alternatively, the air or gas can be heated slightly prior to directing it across the surfaces of the particles (e.g., up to 75° C.).

An important feature of this invention is that heating the particles is generally avoided and is not required. Thus, the process allows obtaining very dry particles without the expense associated with thermal drying procedures.

EXAMPLE 1

A run-of-mine coal from the Lower Kittaning (~100 mesh) seam was mixed with water to prepare a coal slurry containing 20% solids. A water-soluble hydrophobic polymer (polymethylhydrosiloxane (MW<100,000)) was added to the slurry in the amount of 13 lbs/ton of coal on a dry basis. The slurry was agitated for one minute to ensure complete dissolution of the reagent and subsequent adsorption on the coal surface, so that the coal particles in the slurry become hydrophobic. The slurry was then subjected to vacuum filtration. In control tests in which no dewatering aids were used, the moisture content was 26%. When the dewatering aid was used, the moisture was reduced to 11%. These results demonstrated that the hydrophobic dewatering aids can be used at high % solids.

EXAMPLE 2

A dried clean coal column flotation product (100×0 mesh) from Cape Breton, Nova Scotia, was dispersed in water to prepare a coal slurry containing 2% solids. A butanol solution containing 8% by weight ethylene glycol monooleate (EGMO), a fatty ester, was added to the slurry in the amounts of 0.25-3 lbs/ton (EGMO) on a dry basis. The slurry was then agitated for one minute to ensure adequate dispersion and dissolution of the reagent and subsequent adsorption on the coal surface, so that the coal particles in the slurry become hydrophobic. The coal slurry was then subjected to vacuum filtration at 20 psi with a drying time of one minute after liquid drainage. The filtration experiment was conducted using a ceramic Buchner filtering funnel with medium porosity filter paper. The dewatered coal samples were recovered from the funnel and analyzed for moisture content.

Table 1 presents the results obtained using different dewatering aid dosages. In the absence of any dewatering aids (baseline test), the average moisture content was 34.8%. Using 0.25 lbs/ton of EGMO, the moisture content was reduced to 10.1%. The moisture content was further reduced to 1.4% when 3 lbs/ton of EGMO was used. The use of the dewatering aid also resulted in an increase of the filtration rate to as high as five times compared to that without dewatering aid.

TABLE 1

| EGMO Dosage (lbs/ton) | % moisture |
| --- | --- |
| 0 | 34.8 |
| 0.25 | 10.1 |
| 0.65 | 5.7 |
| 3.0 | 1.4 |

EXAMPLE 3

A run-of-mine coal from the Lower Kittaning (100×0 mesh) seam was dispersed in water at 13.8% solids. A butanol solution containing EGMO (8% by weight) was added to the slurry and agitated for one minute. The slurry was then subjected to vacuum filtration using a Buchner filtering funnel with a coarse glass frit (40–60 μm). Table 2 shows the results obtained using different drying times after drainage. In baseline tests where no dewatering aids were added, the moisture content was 29% after one minute of drying and was reduced to 27.1% after ten minutes drying. The moisture content is reduced significantly, to as low as 3.9% with the use of the dewatering aid and longer drying time. It should be noted that even with a drying time of 10 minutes, the moisture content was only reduced to 27.1% in the absence of the dewatering aid. The filtration rates were also increased four to five times higher when EGMO was added.

TABLE 2

| EGMO DOSAGE | % Moisture | | |
| --- | --- | --- | --- |
| (Lbs/ton) | 1 min Dry | 5 min Dry | 10 min Dry |
| 0 | 29.0 | 28.0 | 27.1 |
| 1.5 | 16.9 | 13.3 | 11.5 |
| 3.0 | 13.1 | 8.8 | 3.9 |

Similar dewatering tests were also conducted on this run-of-mine Lower Kittaning coal slurry (13.8% solids, 100×0 mesh) using other types of fatty esters without any carrier solvent (i.e., butanol) added. Using 1.4 lbs/ton of DL-α-monoolein (rac-Glycerol 1-monooleate), the moisture content was reduced to 16.4% after one minute of drying. In another test where 37 lbs/ton of methyl oleate was used, the moisture content was reduced to 7.9% after five minutes of drying. Similar to those observed with the use of EGMO, the filtration rates obtained in these tests were about four times higher than those without using a dewatering aid.

EXAMPLE 4

A run-of-mine Lower Kittaning coal sample (100×0 mesh) was subjected to dewatering tests using a Buchner filtering funnel with a coarse glass frit (40–60 μm). The coal sample was mixed with water to make a slurry containing 13.8% solids. A hydrophobic polymer, polymethylhydrosiloxane (PMHS) was added to the slurry and then agitated for one minute to ensure complete dispersion and dissolution of the polymer. The slurry was then filtered for different periods of time. In baseline tests where no dewatering aids were added, the moisture content was 30%. Using 4.6 lbs/ton of PMHS, the moisture content was reduced to 17.4% after five minutes of filtration. At a higher dosage of PMHS (13 lbs/ton), the moisture content was reduced to 8.9%.

EXAMPLE 5

Dewatering tests were conducted on actual flotation products obtained from different coal cleaning plants. In these tests, the ethylene glycol monooleate (8% by weight) in butanol solution was added to the coal slurry sample and agitated for one minute. The sample was then subjected to a bottom fed filter leaf test using a standard EIMCO filter leaf with a polypropylene filter media. The leaf was dipped into the slurry for 15 seconds (cake-formation time) at a vacuum pressure of 20 psi and then removed and held at an upright position in air for one minute (drying time). After the drying time, the vacuum was stopped and the cake was discharged by lifting with a spatula. Table 3 shows the results obtained with different coal slurry samples with and without any dewatering aids. In baseline tests obtained in the absence of dewatering aids, the average moisture content of a Middle Fork column concentrate was 41.9%. Using 2.9 lbs of EGMO per ton of coal, the moisture content of this flotation column concentrate was reduced to 23.7%. The filtration rate obtained with the use of EGMO was much higher as indicated by the thicker cake and larger volume of flitrate recovered. For the Maple Meadow flotation concentrate, the moisture content was reduced from 35.8% (without dewatering aid added) to 14.5% with the addition of 3.9 lbs of EGMO per ton of dry coal. The moisture content of the Lady Dunn column concentrate was reduced from 44.7% (without dewatering aid) to 28% using 3.9 lbs of EGMO per ton of dry coal. Again, the filtration rates obtained with the use of EGMO were significantly higher than those without any dewatering aid added.

TABLE 3

| | % Moisture | |
| --- | --- | --- |
| Coal Sample | W/O EGMO | W/EGMO |
| Middle Fork Column Conc.[1] | 41.9 | 23.7[2] |
| Maple Meadow Flotation Conc.[3] | 35.8 | 14.5[4] |
| Lady Dunn Column Conc.[5] | 44.7 | 28.0[4] |

[1]Flotation column concentrate (15% solids, 100 × 0 (mesh) from refuse pond
[2]2.9 lbs/ton EGMO added
[3]Floatation concentrate (28% solids, 100 × 0 mesh)
[4]3.9 lbs/ton EGMO added
[5]floatation column concentrate (8% solids, 100 × 0 mesh)

Similar bottom fed filter leaf tests were also conducted on Middle Fork flotation column concentrate using other reagents as dewatering aids (i.e., polymethylhydrosiloxane (PMHS), DL-α-monoolein, and polyethylene glycol (400)

monooleate). In one test where 5 lbs/ton PMHS was used, the moisture content was reduced to 23.7%. In another test where 1.25 lbs/ton DL-α-monoolein was added, a moisture content of 28.2% was obtained. Tests conducted where 4 lbs/ton of polyethylene glycol (400) monooleate was used resulted in a moisture content of 29.9%.

EXAMPLE 6

Actual clean coal filter feed samples from Consol Inc. coal cleaning plants were subjected to bottom fed filter leaf tests. The clean coal samples (30% solids, 28×0 mesh) used were from Pocahontas No. 3 and Pittsburgh No. 8 seams. Using a cake-formation time of 15 seconds and a drying time of one minute, the moisture contents were determined for samples dewatered with and without the addition of butanol solutions containing EGMO (8% by weight). For the Pocahontas No. 3 sample, the moisture content was reduced from 37.6% (without dewatering aid) to 16.3% with the addition of 1.6 lbs EGMO per ton of coal on a dry basis. The moisture content of the Pittsburgh No. 8 sample was reduced from 41.8% (without dewatering aid) to 23% when 2.8 lbs/ton EGMO was added.

EXAMPLE 7

Lead and zinc sulfide concentrates (325×0 mesh) obtained from batch laboratory flotation tests were subjected to dewatering tests. These concentrates were obtained from a Red Dog ore, Alaska. The concentrate sample was dispersed in water at 10% solids. A butanol solution containing EGMO (8% by weight) was added to the mineral slurry and agitated for one minute. The slurry was then subjected to vacuum filtration at 20 psi using a Buchner filtering funnel with a fine filter paper (2.5 μm). A drying time of one minute after drainage was used for these tests. Table 4 shows the results obtained with different amounts of EGMO added. In the baseline tests (no dewatering aid added), the moisture content obtained was 16.6% for the zinc concentrate and 17.6% for the lead concentrate. When EGMO is added, the moisture content is reduced to as low as 9.9% and 9.13% for the zinc and lead concentrates, respectively.

TABLE 4

| EGMO Dosage | % Moisture | |
|---|---|---|
| (Lbs/ton) | Zinc Conc. | Lead Conc. |
| 0 | 16.6 | 17.6 |
| 0.14 | 14.1 | 14.7 |
| 0.6 | 13.3 | 12.5 |
| 1.1 | 11.9 | 11.5 |
| 2.8 | 10.7 | 10.0 |
| 4.3 | 9.9 | 9.1 |

While the invention has been described in terms of its preferred embodiments, those skilled in the art will recognize that the invention can be practiced with modification within the spirit and scope of the appended claims.

We claim:

1. A method for dewatering moist particulates, comprising the steps of:
   combining a mono-unsaturated fatty ester with a carrier solvent and a moist particulate solution comprised of 1–99% by weight water and 1–99% by weight particulate to form a treated combination, said mono-unsaturated fatty ester comprising less than 10% by weight of said treated combination, said mono-unsaturated fatty ester increasing a contact angle between water and a surface of a particle in said moist particulate solution;
   agitating said treated combination to distribute said mono-unsaturated fatty ester on surfaces of said particulates in said treated combination; and
   mechanically removing water from said surfaces of said moist particulates to produce dry particulates.

2. The method of claim 1 wherein said mono-unsaturated fatty ester has a chemical structure defined as $R_1$—C(O)—O—$R_2$ where $R_1$ is an oleate and $R_2$ is selected from the group consisting of alkyl and alcohol moieties.

3. The method of claim 2 wherein said mono-unsaturated fatty ester is selected from the group consisting of methyl oleate, rac-glycerol monooleate, and ethylene glycol monooleate.

4. The method of claim 1 wherein said combining step includes the step of selecting said particulate in said moist particulate solution to have a diameter of less than three inches.

5. The method of claim 4 wherein said particulate is selected to have a diameter of less than 10 mm.

6. The method of claim 1 wherein said combining step includes the step of selecting said particulate in said moist particulate solution to be selected from the group consisting of coals, clays, sulfide minerals, phosphates, metal oxide minerals, metals, industrial minerals, and waste materials.

7. The method of claim 6 wherein said particulate is selected to be coal.

8. The method of claim 1 wherein said step of removing water includes the step of directing a gaseous fluid across surfaces of said particulates.

9. A method for dewatering moist particulates, comprising the steps of:
   combining polymethylhydrosiloxane having a chemical formula of $(CH_3)_3SiO((CH_3)HSiO)_nSi(CH_3)_3$, where n is a number such that the molecular weight of said polymethylhydrosiloxane is less than 100,000, with a moist particulate solution comprised of 1–99% by weight water and 1–99% by weight particulate to form a treated combination, said polymethylhydrosiloxane increasing a contact angle between water and a surface of a particle in said moist particulate solution;
   agitating said treated combination to distribute said polymethylhydrosiloxane on surfaces of said particulates in said treated combination; and
   mechanically removing water from said surfaces of said moist particulates to produce dry particulates.

10. The method of claim 9 wherein said combining step includes the step of selecting said particulate in said moist particulate solution to have a diameter of less than three inches.

11. The method of claim 10 wherein said particulate is selected to have a diameter of less than 10 mm.

12. The method of claim 9 wherein said combining step includes the step of selecting said particulate in said moist particulate solution to be selected from the group consisting of coals, clays, sulfide minerals, phosphates, metal oxide minerals, metals, industrial minerals, and waste materials.

13. The method of claim 12 wherein said particulate is selected to be coal.

14. The method of claim 9 wherein said step of removing water includes the step of directing a gaseous fluid across surfaces of said particulates.

15. A method for dewatering moist particulates, comprising the steps of:
   combining a hydrophobizing reagent with a carrier solvent and a moist particulate solution comprised of 1–99% by weight water and 1–99% by weight particulate to form a treated combination, said hydrophobizing agent being a fatty ester and comprising less than 10% by weight of said treated combination;

agitating said treated combination to distribute said hydrophobizing reagent on surfaces of said particulates in said treated combination, said hydrophobizing reagent increasing a contact angle between water and a surface of a particle in said moist particulate solution to greater than 65°; and removing water from said surfaces of said moist particulates to produce dry particulates.

16. The method of claim 15 wherein said hydrophobizing reagent has an HLB value of less than 10.

17. The method of claim 15 wherein said contact angle is greater than 80°.

18. The method of claim 15 wherein said removing step is performed by a mechanical process selected from the group consisting of centrifugation, filtration, and application of gas pressure.

19. The method of claim 15 further comprising the step of selecting said particulate in said moist particulate solution from the group consisting of coals and sulfide minerals.

20. The method of claim 15 wherein said removing step achieves a moisture content for said dry particulates of less than 20%.

21. The method of claim 15 wherein said removing step achieves a moisture content for said dry particulates of less than 10%.

22. A method for dewatering moist particulates, comprising the steps of:

combining a hydrophobizing reagent having an HLB value less than 10 that is a fatty ester with a moist particulate solution comprised of 1–99% by weight water and 1–99% by weight particulate to form a treated combination, said hydrophobizing reagent comprising less than 10% by weight of said treated combination;

dispersing said hydrophobizing reagent throughout said treated combination to coat surfaces of said particulates in said treated combination, said hydrophobizing reagent increasing a contact angle between water and a surface of a particle in said moist particulate solution to greater than 65°; and removing water from said surfaces of said moist particulates to produce dry particulates.

23. The method of claim 22 wherein said contact angle is greater than 80°.

24. The method of claim 22 wherein said removing step achieves a moisture content for said dry particulates of less than 20%.

25. The method of claim 22 wherein said removing step is performed by a mechanical process selected from the group consisting of centrifugation, filtration, and application of gas pressure.

* * * * *

UNITED STATES PATENT AND TRADEMARK OFFICE
CERTIFICATE OF CORRECTION

PATENT NO. : 5,670,056
DATED : September 23, 1997
INVENTOR(S) : Roe-Hoan Yoon, Cesar Indiongco Basilio It is certified that error appears in the above-indentified patent and that said Letters Patent is hereby corrected as shown below:

In column 1, line 3 beneath the title insert the following:
  --This invention was made with Government support under Contract No. DE-FC22-94PC94152 awarded by the Department of Energy. The Government has certain rights in this invention.--.

Signed and Sealed this

Seventh Day of July, 1998

Attest:

BRUCE LEHMAN

*Attesting Officer*   Commissioner of Patents and Trademarks